W. L. DE REMER.
ANTICREEPER DEVICE FOR RAILS.
APPLICATION FILED AUG. 12, 1908.
960,283.
Patented June 7, 1910.
4 SHEETS—SHEET 2.
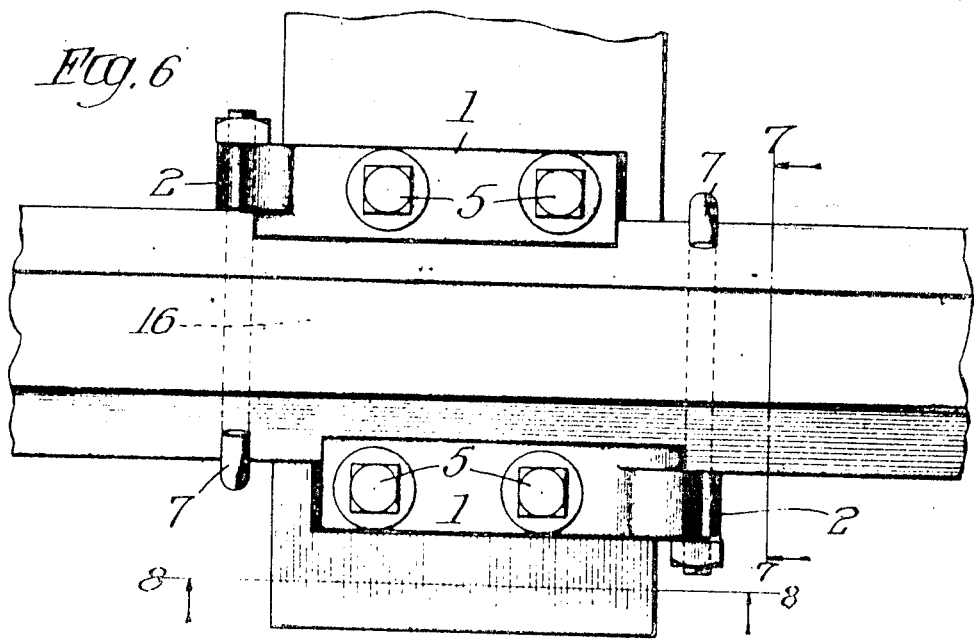
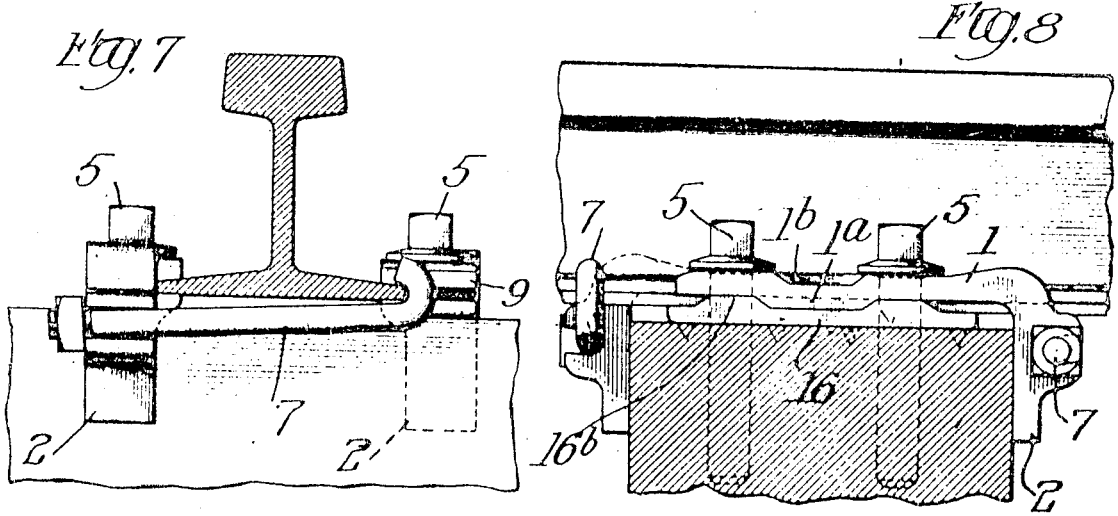
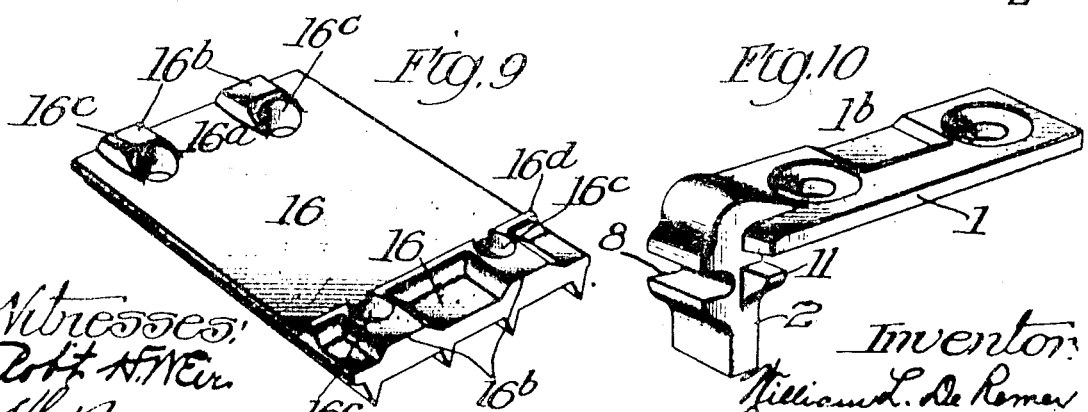
Witnesses:
Inventor
William L. De Remer
By Rector, Hibben & Davis
His Attys

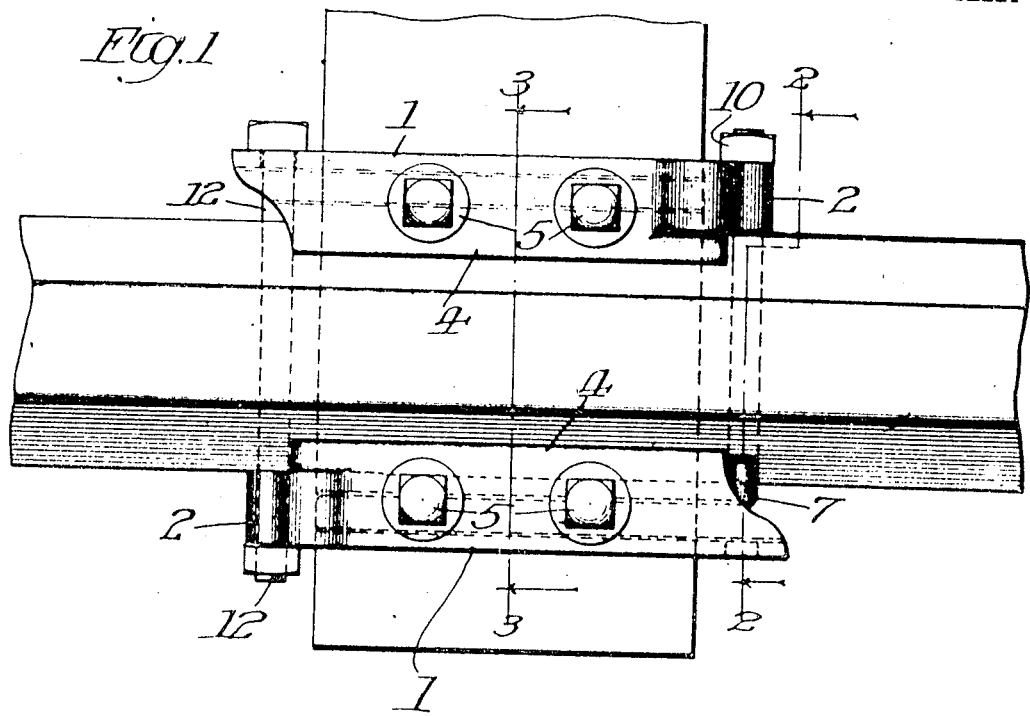

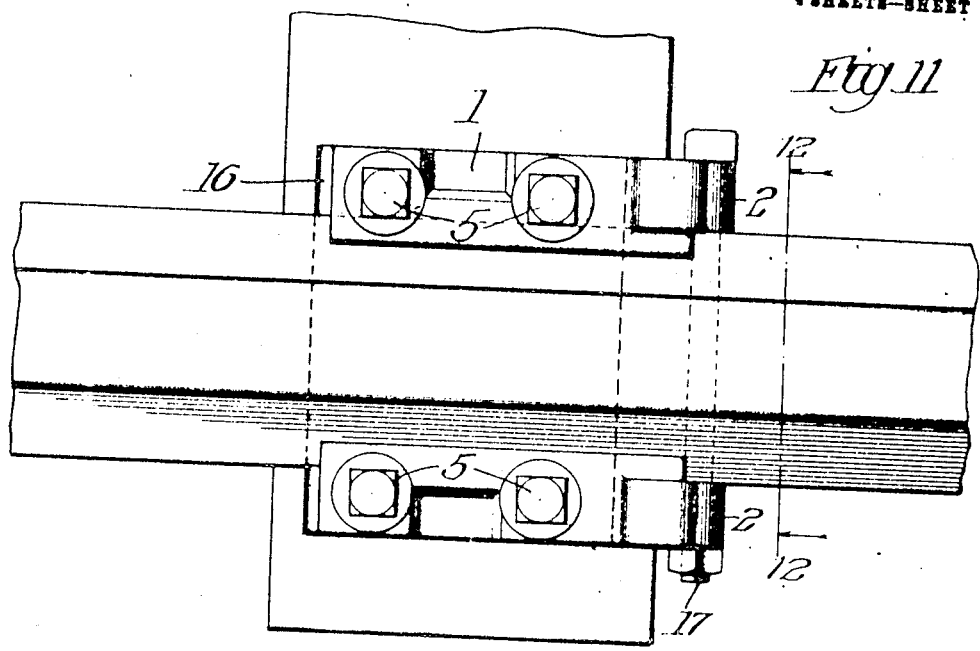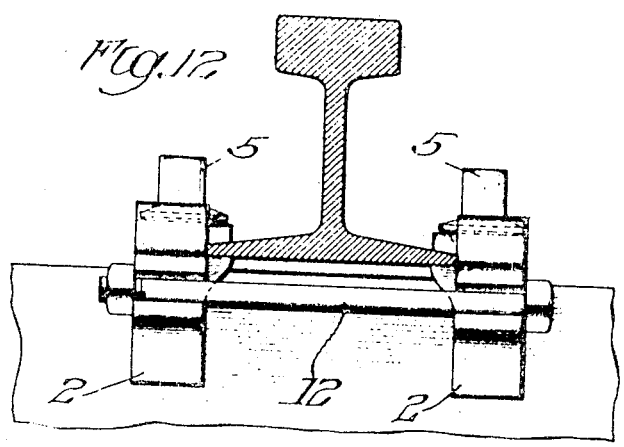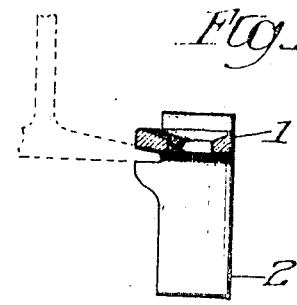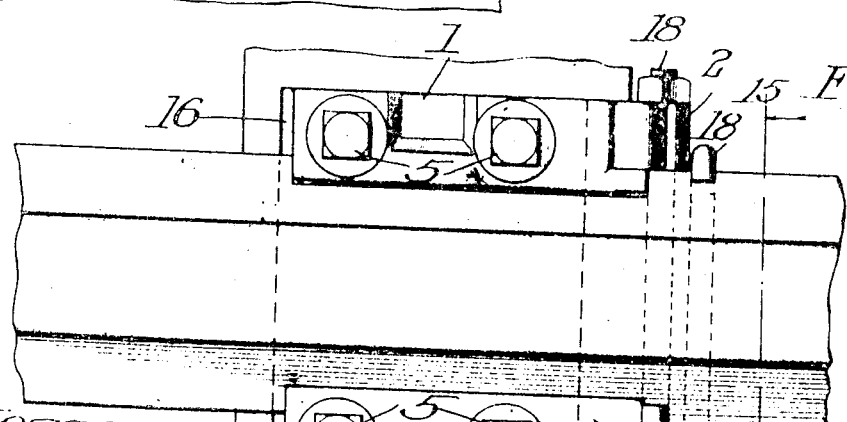

W. L. DE REMER.
ANTICREEPER DEVICE FOR RAILS.
APPLICATION FILED AUG. 12, 1908.
960,283.
Patented June 7, 1910.
4 SHEETS—SHEET 4.
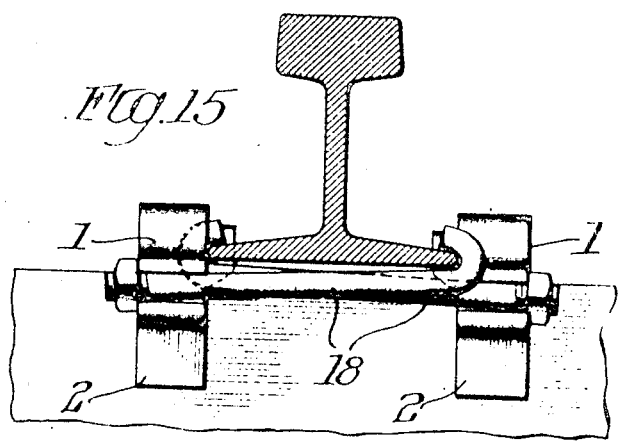
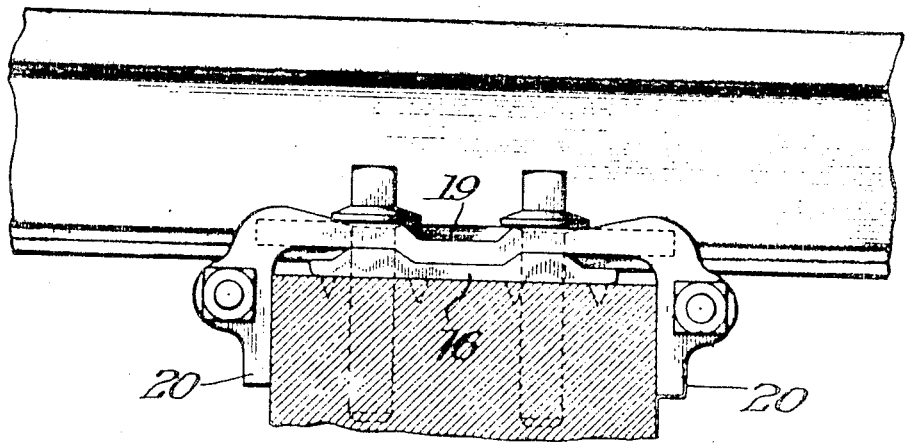
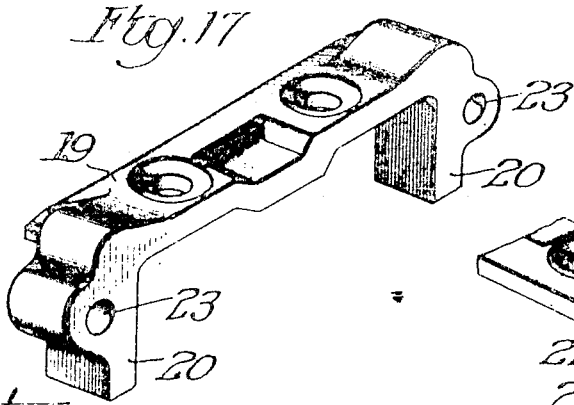
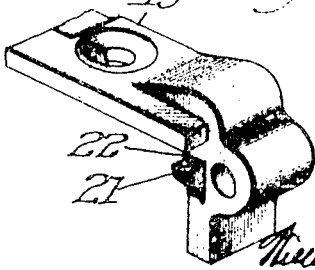

UNITED STATES PATENT OFFICE.

WILLIAM L. DE REMER, OF CHICAGO, ILLINOIS.

ANTICREEPER DEVICE FOR RAILS.

960,283.   Specification of Letters Patent.   Patented June 7, 1910.

Application filed August 12, 1908. Serial No. 448,241.

*To all whom it may concern:*

Be it known that I, WILLIAM L. DE REMER, a citizen of the United States, residing at Chicago, in the county of Cook and State of Illinois, have invented certain new and useful Improvements in Anticreeper Devices for Rails, of which the following is a specification.

My invention relates to anti-creeper devices for rails to prevent the well-known creeping or longitudinal movement of the rails due to the traffic thereon and the object of my invention is to provide a simple, efficient and durable device of this character, such device being capable of overcoming and preventing such creeping and of such construction that it may be readily and conveniently applied or removed as desired. Moreover, my device is so constructed that with slight mechanical changes to make them rights and lefts, the same may be used for single track roads or double track roads and in the case of one form of my device the same form may be employed for both kinds of track.

The various features of novelty and utility in my new form of device will be apparent from the description hereinafter given.

In the drawings Figure 1 is a plan view of my device shown applied to a rail and tie, the device being that preferably designed and intended for single track where the traffic is in both directions; Fig. 2 a sectional elevation on the line 2—2 of Fig. 1;
Fig. 3 a sectional elevation on the line 3—3 of Fig. 1; Fig. 4 a perspective of my said device alone; Fig. 5 a perspective of a portion of said device or anti-creeper proper illustrating slots which engage the flange of the rail; Fig. 6 a plan view of my anti-creeper device similar to that shown in Fig. 1 but showing the same employed in connection with a tie plate; Fig. 7 a sectional elevation on the line 7—7 of Fig. 6; Fig. 8 a section on the line 8—8 of Fig. 6; Fig. 9 a perspective of the particular form of tie plate which I prefer to employ in connection with my said anti-creeper device; Fig. 10 a perspective of said anti-creeper device; Fig. 11 a plan view of my anti-creeper device designed for use on a single track road and illustrating a different form of anchoring said device to the rail; Fig. 12 a section on the line 12—12 of Fig. 11; Fig. 13 a detail view of a part of the device; Fig. 14 a view similar to Fig. 11 but illustrating a different method of anchoring the anti-creeper devices to the rail; Fig. 15 a section on the line 15—15 of Fig. 14; Fig. 16 an elevation illustrating a modified form of anti-creeper device applied to a rail and its tie plate; Fig. 17 a perspective of said modified form of device illustrated in Fig. 16; and Fig. 18 a perspective of a portion of the other side of the device illustrated in Fig. 17.

Speaking in general terms my anti-creeper device comprises a bar of the peculiar construction and formation hereinafter set forth, which bar is adapted to be applied to either the outside or inside of the rail or both sides and also to be applied in a manner depending upon whether the track is single or double to overcome the creeping tendency of the rails. Moreover, my device is intended to be applied to the rails with a frequency depending upon the particular condition of the track. It will therefore be understood that my bar may be used singly with great efficiency and also that various different combinations of bars may be employed, the bars being made rights and lefts to accommodate some of the combinations above suggested.

Referring to the embodiment of my invention illustrated in Figs. 1 to 5, representing the simplest form, said device comprises a bar 1 which is provided at one end with a flange 2 adapted to overhang one side of the tie when the device is in position. By preference and in order that the bar may be as light as possible without sacrificing strength, the same is hollowed out longitudinally on its underside, thereby forming two parallel flanges 3, the innermost one of which is adapted to abut against the side or outer edge of the flange of the rail as clearly shown in Fig. 3 with the result that the side thrust of the rail is resisted and spike cutting effect overcome. The upper portion or inner edge 4 of the bar is so formed or undercut on its lower side as to fit upon the top surface of the rail flange. In practice these bars are held in place upon the tie by suitable track fastenings but in the present instance I have shown screw spikes 5 which pass through the openings 6 in said bar thereby holding the bar to the tie and to the rail, the depending or overhanging flange 2 preventing the movement of said rail longitudinally owing to the clamping action of the bar which has an extended frictional surface upon the flange of the rail. In order to still further anchor or clamp the bar to the rail I provide an additional fastening device which in the present instance consists of a hook bolt 7 whose hook end engages the rail flange on the side opposite to that to which its bar is applied and whose other end passes through a slot 8 formed between the two lugs 9 extending outwardly from the flange 2 of the bar. By preference, and for quick manipulation, this slot 8 is open at its side but it is obvious that a hole or inclosed opening may be provided in said flange as illustrated in the modified form of bar of Fig. 17, hereinafter described. After the bolt has been hooked in place, the nut 10 is tightened, thereby securely anchoring the bar to the rail. As illustrated in Figs. 2 and 4 the inner side of the bar is provided near its ends with a lug 11 which in connection with the inner edge 4 of the bar forms notches to receive and support the rail flange.

The construction and arrangement of my device is such that not only is there obtained the greatest possible area of bearing surface between the bar and the flange of the rail thereby through friction retarding or tending to resist longitudinal movement of the rail but also there is obtained a clamping of the rail to the tie due to the presence and peculiar arrangement of the hook bolt. When the device is applied to the tie and rail, the bolt is placed in a transverse or right-angled position with respect to the length of the rail, and upon the first location change of the rail by longitudinal or creeping movement the bolt is moved from its regular position somewhat by having pivotal or fulcrum points created and the same is thereby allowed through stress to describe a limited arc movement, and when the limit is reached the rail becomes firmly held or anchored to the tie against the possibility of any further movement. The same action takes place in respect to the duplicated arrangement of anti-creeper devices now to be described.

In the above description of my anti-creeper device I have described the same as a bar used singly on one side of the rail but as illustrated in Fig. 1 the same may be used in pairs, one on each side of the rail, with their flange 2 positioned accordingly as the particular track is a single or double track. In the instance illustrated in Fig. 1, the track is supposed to be single and consequently the two bars are so positioned that their flanges 2 will be on opposite sides of the tie. For instance in said figure the lower bar has its flange 2 overhanging the left-hand side of the tie plate while the other bar has its flange overhanging the right-hand side of the tie. It is obvious and will be made apparent from the description of the device illustrated in Fig. 11 that by making the bars rights and lefts, the same may be applied to the rails with their flanges overhanging the same side of the tie. When the bars are used in pairs as illustrated in Fig. 1 they may both have the same kind of hook bolt 7 as above described but if desired the bars themselves may be anchored together and to the rail by means of through bolts at their ends engaging the corresponding ends of both bars, or if desired a hook bolt 7 may be employed at one end of the bars and a through bolt such as the bolt 12 at the other end, see Fig. 1. When such cross fastenings between the bars is employed I prefer to provide the end of the bar opposite the flange 2 with a depending lug 13 overhanging one side of the tie and provided with an opening 14 for the bolt. Furthermore I prefer to provide the end of the bar at the junction of the bar proper and its flange 2 with an enlargement 15 in order to give the same great strength at this place and prevent any bending or breaking at such junction.

In the simplest form of my invention the bar is applied to and rests directly upon the upper face of the tie as illustrated in Figs. 1, 2 and 3 but I prefer to use my bar in connection with a tie plate especially on roads where such tie plates are customarily employed. When such bar is used in connection with a tie plate I prefer to make a special form of bar and also a special form of tie plate to coöperate together for the best results and to this end I have provided the particular form of bar and tie plate illustrated in Figs. 6 to 14.

Referring to the embodiment of my invention as illustrated in Figs. 6 to 10 the bar 1 is similar to that illustrated in Figs. 1 to 4 with the exception that it is provided intermediate its length and on its inner side with a depending portion 1ª which in the process of rolling which I employ occasions a corresponding depression 1ᵇ on the upper surface of the bar. This depending portion is adapted to fit into and interlock with the sockets 16ª of a tie plate 16 as clearly illustrated in Fig. 9. These sockets are formed as an incident to the formation of the enlargements or supports 16ᵇ which form the backing for the spikes when in place in the spike holes 16ᶜ. As shown in Fig. 9 the plate is provided near one end with a shoulder 16ᵈ extending longitudinally of the rail when in position on the tie plate and forming one side of the socket 16ª at this end of the plate. In this form of construction the bar 1 is provided with holes registering with the spike holes with the result that the bar is not only interlocked to the tie plate by the means described but is also secured thereto by the same through fastening as the tie plate, the parts thereby being securely held to each other and to the tie and also to the rail. Moreover, it will be observed that the bar presents a gripping or friction surface along its entire length which surface engages the upper side of the rail flange. In other respects this form of bar is substantially the same as that heretofore described except that it is not provided with the lug 13. While I prefer to employ the interlocking arrangement described yet it is obvious that both the tie plate and the bar may have flat or smooth engaging surfaces.

As described in connection with the form of device illustrated in Figs. 1 to 5 different combinations or arrangements of the bar may be obtained but in Fig. 6 I have shown a combination of these devices more particularly intended for a single track road in which the traffic is in both directions. To meet this condition the bars 1 are made rights and lefts and placed on opposite sides of the rail. That is to say the lower part has its flange 2 overhanging the right-hand side of the tie while the other bar has its flange overhanging the left-hand side of such tie. In this instance the bars are not only interlocked to the tie plate and held by the same spikes employed for the tie plate but are anchored to the rail by means of the same character of hook bolts 7 as heretofore described.

In the case of a double track road in which the traffic is practically all in one direction and where it is desired to employ more than one of my bars, these bars are arranged as illustrated in Fig. 11 according to which arrangement the flanges overhang the same side of the tie. To anchor these bars together suitable means may be employed such as the through bolt 17 engaging the flanges 2 of the bars. However, if preferred a pair of hook bolts may be substituted for the single through bolt 17 in which event I elongate or enlarge the bar or upper end of its flange at 2ª as indicated in Figs. 14 and 15 to enable the hook bolts 18 to be positioned parallel to each other and to engage opposite sides of the rail flange at the same side of the tie.

As shown in Figs. 16, 17 and 18 the bar, here indicated by 19, may be provided at each end with a flange, indicated at 20. In this particular instance the bar has interlocking engagement with the tie plate. By the use of this form of bar, a single bar will suffice for preventing creeping of the rail in whichever direction the traffic may be.

The bar is provided at each end with a lug 21 similar to the lugs 11 hereinbefore described, the same being illustrated at one end in Fig. 18. These lugs form notches 22 in order to receive the flange of the rail. Moreover, the flanges 20 of the bar are provided with transverse holes 23 to receive the anchoring bolts, which holes may be used in place of the notches 8 hereinbefore referred to.

By the use of my invention I am enabled to provide a very simple, efficient and durable device for preventing the creeping of rails, practically the same character of device being employed in different combinations and arrangements, adapting it for use on both single track and double track roads. Moreover, the device not only serves its function of preventing rail creeping but also serves or assists as a track fastener for fastening the rail to the tie. Furthermore the construction or formation of the device is such that it may be very economically produced and produced moreover of the lightest weight in proportion to the greatest strength.

I claim:

1. In an anti-creeper device for rails, the combination of a tie plate, a bar interlocked therewith and adapted to engage one side of the rail, and a bolt engaging between said bar and the other side of the rail.

2. In an anti-creeper device for rails, the combination of a tie plate, a bar interlocked therewith and adapted to engage one side of the rail, and a bolt coöperating at one end with the bar and having a hook at its other end to engage the other side of the rail.

3. In an anti-creeper device for rails, the combination of a tie plate, a bar interlocked therewith and adapted to engage one side of the rail, and a bolt engaging between the bar and other side of the rail and having pivotal action in respect thereto.

4. In an anti-creeper device for rails, the combination, with a tie plate, of a bar supported thereon and adapted to bear along its length against the flange of a rail and having a flange portion adapted to overhang and fit against a side of the tie, and means for securing said bar in place.

5. In an anti-creeper device for rails, the combination, with a tie plate, of a bar supported thereon and adapted to bear along its length against the flange of a rail and secured in place on the tie by the same fastening device as the tie plate, said bar having a depending end flange adapted to overhang and fit against a side of the tie, and means for holding the bar to the rail.

6. In an anti-creeper device for rails, the combination, with a tie plate, of a bar supported thereon and adapted to bear along its length against the flange of a rail and having a depending end flange adapted to overhang and fit against a side of a tie, and a hook bolt, the hook end of which engages the rail flange on one side and the other end engages the flange of the bar on the other side of the rail for pivotal action with respect thereto.

7. In an anti-creeper device for rails, the combination, with a tie plate, of a bar adapted to bear along its length against the flange of a rail and interlocking with the tie plate, said bar having a depending end flange adapted to overhang a side of the tie, and means for holding the bar in place.

8. In an anti-creeper device for rails, the combination, with a tie plate, of a bar adapted to rest upon such plate and to bear along its length against the flange of a rail, said bar and plate having interlocking portions on their adjacent faces, and said bar having a depending end flange adapted to overhang one side of a tie, and means for holding the bar in place.

9. In an anti-creeper device for rails, the combination, with a tie plate, of a bar adapted to rest upon such plate and to bear along its length against the flange of a rail, said plate having a top depression and the bar having a complementary projection fitting thereinto for interlocking purposes, said bar having a depending end flange adapted to overhang one side of a tie, and means for holding the bar in place.

10. An anti-creeper device for rails comprising a bar adapted to bear along its length against the flange of a rail and having a depending end flange adapted to overhang and bear against a side of a tie, and a hook bolt, the hook end of which engages the rail flange on one side and the other end engages the flange of the bar on the other side of the rail, said bar having a side notch into which one end of the bolt is introduced.

11. In an anti-creeper device for rails, the combination of a tie plate having a recessed portion at one end and on its upper side and ribs on its underside, and a bar resting upon said plate and adapted to bear along its length against the rail flange, said bar having a projection to engage said recessed portion and also having a depending end flange to overhang one side of a tie, and means for securing said bar in place.

12. In an anti-creeper device for rails, the combination, with a tie plate, of bars arranged upon the ends thereof on opposite sides of the rail and adapted to bear along their length against the rail flange, said bars having depending end flanges to overhang the tie, and means coöperating with the bar flanges and rail flange for holding the bars.

13. In an anti-creeper device for rails, the combination, with a tie plate, of bars arranged upon the ends thereof on opposite sides of the rail and adapted to bear along their length against the rail flange, said bars having depending end flanges to overhang the tie and having interlocking engagement with the tie plate, and means coöperating with the bar flanges and rail flange for holding the bars.

14. In an anti-creeper device for rails, the combination, with a tie plate, of bars arranged upon the ends thereof on opposite sides of the rail and adapted to bear along their length against the rail flange, said bars having depending end flanges to overhang the tie, and hook bolts, the straight end of each of which engages its bar flange and the hook end of which engages the rail flange on the side of the rail opposite that on which its bar is located; substantially as described.

15. An anti-creeper device for rails comprising bars adapted to be positioned on opposite sides of the rail to bear along their length against the rail flange, said bars having depending end flanges and being reversely positioned one with respect to the other whereby said end flanges will overhang opposite sides of a tie, and means coöperating with said bar flanges and rail flange for holding the bars.

16. In an anti-creeper device for rails, the combination, with a tie plate, of bars arranged upon the ends thereof on opposite sides of the rail and adapted to bear along their length against the rail flange, said bars having depending end flanges to overhang the tie, and means coöperating with the bar flanges and rail flange for holding the bars, the ends of the tie plate and the underside of the bars being formed for interlocking engagement.

17. In an anti-creeper device for rails, the combination, with a tie plate, of bars arranged upon the ends thereof on opposite sides of the rail and adapted to bear along their length against the rail flange, said bars having depending end flanges and being reversely positioned one with respect to the other whereby said end flanges will overhang opposite sides of a tie, and hook bolts at one end engaging the rail flange and at the other end engaging said bar flanges.

18. In an anti-creeper device for rails, the combination, with a tie plate having spike openings toward its ends and recesses therebetween, of bars arranged upon the ends of the tie plate and adapted to bear upon the rail flanges, said bars having projecting portions on their undersides to enter said recesses for interlocking engagement, and also having end flanges overhanging the tie, and means coöperating with said bar flanges for holding the bars.

19. In an anti-creeper device for rails, the combination of a tie-plate having spike openings provided with reinforcements which form recesses, a bar arranged upon the end of the tie-plate and having interlocking engagement therewith at said recesses, said bar being provided with a flange overhanging a side of the tie.

20. An anti-creeper device for rails comprising a bar adapted to bear upon the rail flange and having a depending end flange adapted to overhang and fit against a side of the tie and also having on its underside a flange adapted to bear against an edge of the rail flange to resist side thrust and spike cutting, and means for securing said bar in place.

WILLIAM L. DE REMER.

Witnesses:
S. E. HIBBEN,
LOUIS B. ERWIN.